United States Patent
Satou

[11] Patent Number: 6,144,459
[45] Date of Patent: Nov. 7, 2000

[54] FACSIMILE MACHINE ADAPTED TO REDUCE RISK OF DATA LOSS

[75] Inventor: Keiji Satou, Tokyo, Japan

[73] Assignee: Oki Data Corporation, Tokyo, Japan

[21] Appl. No.: 09/182,721

[22] Filed: Oct. 29, 1998

Related U.S. Application Data

[63] Continuation of application No. 08/695,471, Aug. 12, 1996.

[30] Foreign Application Priority Data

Aug. 29, 1995 [JP] Japan ................................. 7-220564

[51] Int. Cl.[7] .............................. H04N 1/00; G06F 15/00
[52] U.S. Cl. ......................... 358/1.15; 358/404; 358/444
[58] Field of Search .................... 358/404, 434, 358/442, 444, 468, 1.15, 1.16, 1.17, 403, 406; H04N 1/32

[56] References Cited

U.S. PATENT DOCUMENTS

| | | |
|---|---|---|
| H1677 | 9/1997 | Hu et al. . |
| 5,349,448 | 9/1994 | Hirai . |
| 5,465,162 | 11/1995 | Nishii et al. . |
| 5,659,669 | 8/1997 | Narukawa et al. . |
| 5,898,824 | 4/1999 | Kato et al. ................................ 395/115 |
| 5,923,442 | 7/1999 | Miyaoka .................................. 358/442 |

*Primary Examiner*—Madeleine Nguyen
*Attorney, Agent, or Firm*—Alkin, Gump, Strauss, Hauer & Feld, L.L.P.

[57] ABSTRACT

According to a first aspect of the invention, when temporarily unable to print, a facsimile machine stores received facsimile data in an internal buffer memory, transfers facsimile data from the buffer memory to a coupled computer system to prevent overflow of the buffer memory, and later prints a list of facsimile transmissions transferred to the computer system. According to a second aspect of the invention, when temporarily unable to print, a facsimile machine stores received facsimile data in an internal buffer memory, and transfers facsimile data from the buffer memory to another facsimile machine to prevent overflow of the buffer memory.

2 Claims, 9 Drawing Sheets

FIG. 3

FAX TRANSFER REPORT  95/6/9
                     10:51

THE FAXES LISTED BELOW
COULD NOT BE PRINTED. THESE
FAXES HAVE BEEN TRANSFERRED TO
YOUR COMPUTER

| No. | SENDER | DATE & TIME | PAGES |
|-----|--------|-------------|-------|
| 011 | ACME | 95/6/9 9:45 | 002 |

FIG. 6

FAX TRANSFER NOTICE
       1993.09.27 16 : 30

THE FAXES LISTED BELOW WERE TRANSFERED FROM A DISABLED FAX MACHINE WITH TEL. No. 6421

| NO. | SENDER | DATA & TIME | PAGES |
|---|---|---|---|
| 021 | ACME | 1993.09.27 16 : 20 | 009 |

FACSIMILE MACHINE ADAPTED TO REDUCE RISK OF DATA LOSS

This is a continuation of application Ser. No. 08/695,471 filed Aug. 12, 1996.

BACKGROUND OF THE INVENTION

The present invention relates to a facsimile machine having an internal buffer memory.

An internal buffer memory enables a facsimile machine to receive facsimile transmissions when the facsimile machine has run out of paper, or is for some other reason temporarily incapable of printing; store the received facsimile image data; and print the image data later, after the print-disabling condition has been corrected. This scheme fails, however, if the buffer memory overflows due to the continued arrival of facsimile transmissions before the disabling condition can be corrected. If the buffer memory overflows, a facsimile transmission may be incompletely received, and a transmission error will be reported at the transmitting facsimile machine, causing irritation to the human users at both ends.

If the receiving facsimile machine is interfaced to a personal computer, an alternative scheme is available: incoming image data can be transferred to the personal computer system. A choice between these schemes may be available: the facsimile machine may have both an internal buffer memory and a personal-computer interface. In this case, conventional facsimile machines have been designed to use one scheme or the other, but not both. That is, if a conventional facsimile machine is set to transfer incoming image data to the personal computer system, it will not store the data in its internal buffer memory. Conversely, if set to store incoming image data in its internal buffer memory, the conventional facsimile machine will not attempt to transfer data to a personal computer.

When such a facsimile machine is set to use its internal buffer memory, the original problem still occurs. If the print-disabling condition continues, the buffer may overflow, causing facsimile image data to be lost.

Problems also occur when the facsimile machine is set to transfer incoming image data to a personal computer system. One problem is that the personal computer itself may be in a disabled condition, so that all incoming facsimile messages are lost. Another problem is that even if the personal computer system is operating normally, the amount of space available for storing files in the personal computer system is unknown to the facsimile machine. If this space becomes exhausted during the reception of a facsimile transmission, the same problems occur as when the facsimile machine's buffer memory overflows. Finally, even when all received facsimile image data are successfully stored in the personal computer system, the human user may remain unaware of this, and in any event will not know what facsimile transmissions have been received and stored, or where these facsimile transmissions originated.

A further problem is that many facsimile machines are not interfaced to a personal computer and hence cannot avail themselves of the second scheme described above.

SUMMARY OF THE INVENTION

It is accordingly an object of the present invention to prevent unnecessary loss of incoming facsimile image data when a facsimile machine is in a print-disabled condition, by using both an internal buffer memory in the facsimile machine and a file memory in a connected computer system.

Another object of the invention is to enable a facsimile machine to inform a human user of the transfer of incoming facsimile image data to a computer system.

Yet another object is to provide the user with relevant information about the facsimile image data transferred to the computer system, so that the user can decide when to print these facsimile image data.

A further object is to prevent unnecessary loss of incoming facsimile image data when a first facsimile machine is in a print-disabled condition, by transferring the facsimile image data to a second facsimile machine.

A still further object is to enable the [transferred] facsimile image data to be transferred back to the first facsimile machine without being printed at the second facsimile machine.

According to a first aspect of the invention, a facsimile machine has a buffer memory for storing incoming facsimile image data received when the facsimile machine is unable to print, and an interface to a computer system. A buffer supervisory means compares the available space in the buffer memory with a threshold value. When the available space falls below the threshold value, a data transfer means transfers facsimile image data from the buffer memory through the interface to the computer system, causing the facsimile image data to be stored in the computer system, and freeing up space in the buffer memory.

A directory managing means maintains, in a work memory area in the facsimile machine, a first directory of facsimile image data that have been stored in the buffer memory, and a second directory of facsimile image data that have been transferred from the buffer memory to the computer system. When the facsimile machine is restored to a print-capable condition, the directory managing means causes the facsimile machine to print a report listing the facsimile image data that have been transferred to the computer system. The human user will see the report and can transfer the facsimile image data back at a convenient time from the computer system to the facsimile machine, to be printed by the facsimile machine.

According to a second aspect of the invention, a first facsimile machine has a buffer memory for storing incoming facsimile image data received when the first facsimile machine is unable to print, and a memory means for storing the telephone number of a second facsimile machine. A buffer supervisory means compares the available space in the buffer memory with a threshold value. When the available space falls below the threshold value, a data transfer means transfers facsimile image data from the buffer memory of the first facsimile machine to the second facsimile machine. The facsimile image data may be printed by the second facsimile machine, or transferred back later to the first facsimile machine and printed by the first facsimile machine.

BRIEF DESCRIPTION OF THE DRAWINGS

In the accompanying drawings:

FIG. 3 shows an example of a transfer report printed by the first embodiment.

FIG. 6 shows an example of a transfer report printed by the associated facsimile machine in the second embodiment.

DETAILED DESCRIPTION OF THE INVENTION

Embodiments of the invention will be described with reference to the attached illustrative drawings.

Figure 1:
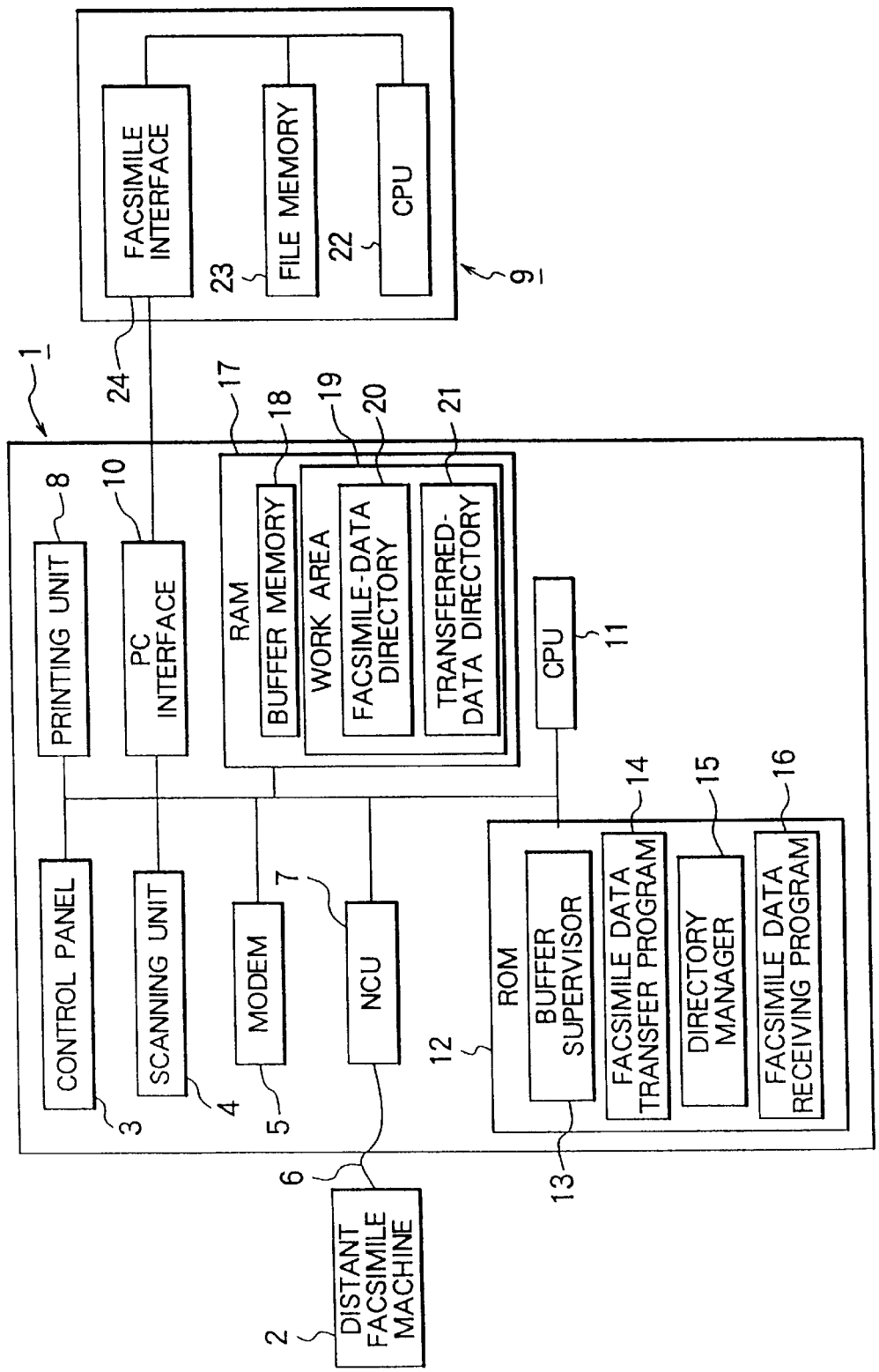
FIG. 1 is a block diagram of the first embodiment, illustrating the invented facsimile machine and a coupled computer system.

Referring to FIG. 1, in all embodiments, the invented facsimile machine 1 communicates with a distant facsimile machine 2. The invented facsimile machine 1 has certain standard elements common to all facsimile machines, such as a control panel 3 with a keypad for entering telephone numbers, a scanning unit 4 for scanning document pages and converting images of these pages to digital data, a modulator-demodulator or modem 5 for converting between digital and analog signal waveforms, so that the data can be transmitted on a telephone line 6, a network control unit or NCU 7 for controlling the connection of the facsimile machine 1 to the telephone network, and a printing unit 8 for printing documents received from the distant facsimile machine 2 on paper or other media. Descriptions of these well-known elements will be omitted.

In the first embodiment, the invented facsimile machine 1 is also coupled by an electrical cable or similar link to a personal computer 9, and has a personal-computer (PC) interface 10 for transmitting and receiving data on this link. The PC interface 10 conforms to, for example, the widely-used RS-232C standard for serial data communication.

A central processing unit or CPU 11 carries out overall control of the facsimile machine 1. The CPU 11 is, for example, a microprocessor that executes programs stored in a read-only memory 12. Besides controlling the elements mentioned above, these programs perform such well-known tasks as compression of the data output by the scanning unit 4, expansion of compressed data for input to the printing unit 8, and detection of error conditions.

Among the programs stored in the read-only memory 12 are also a novel buffer supervisor 13, a facsimile data transfer program 14, a directory manager 15, and a facsimile data receiving program 16. The functions of these programs will be described later.

The facsimile machine 1 also has a random-access memory or RAM 17. Part of the RAM 17 is used as a buffer memory 18 for storing received facsimile image data. Another part of the RAM 17 is a work area 19, in which a facsimile-data directory 20 and transferred-data directory 21 are maintained.

The personal computer 9 has a central processing unit 22, a file memory 23, and a facsimile interface 24. The facsimile interface 24 conforms to the same interface specifications as the PC interface 10, enabling the facsimile machine 1 to communicate with the personal computer 9. The file memory 23 comprises, for example, a rotating magnetic disk.

Next the operation of the first embodiment will be described.

The CPU 11 checks the status of the facsimile machine 1 at regular intervals to determine whether the facsimile machine 1 is capable of printing. If the facsimile machine 1 is able to print, facsimile image data received via the telephone line 6 and NCU 7 are expanded and sent to the printing unit 8 for immediate printing. Although the data may be buffered temporarily in the buffer memory 18, data are constantly being removed from the buffer memory 18 as they are printed, so the buffer memory 18 does not overflow.

If the CPU 11 detects that the facsimile machine 1 is in a print-disabled condition, such as an out-of-toner condition, an out-of-paper condition, or a paper-jammed condition, the CPU 11 stores all received facsimile image data in the buffer memory 18. Each arriving facsimile transmission is stored in a separate file in the buffer memory 18. When [a] an image transmission is stored in the buffer memory 18, the directory manager 15 records information about the transmission in the facsimile-data directory 20. This information includes, for example, the transmission serial number, the time and date of arrival of the transmission, the name of the sender, the number of pages, and the size in bytes of the data stored in the buffer memory 18 for that particular transmission.

Further operation in the print-disabled state will be described with reference to the flowchart in FIG. 2. This flowchart describes a process that is performed at regular intervals by the programs executed by the CPU 11.

In step S1, the buffer supervisor 13 determines the amount of free space still available in the buffer memory 18 and compares this amount with a first threshold value. The amount of free space is determined from, for example, memory management information maintained in a directory not shown in the drawings. If the amount of space is greater than the first threshold value, the process ends, because further facsimile image data can be received without immediate risk of a buffer overflow.

If the amount of available buffer space is not greater than the first threshold value, in step S2 the facsimile data transfer program 14 selects the largest stored file in the buffer memory 18. This selection can be made by referring to the information in the facsimile-data directory 20 and transferred-data directory 21, or to other memory management information maintained by the CPU 11.

In step S3, the facsimile data transfer program 14 transfers the selected file in its entirety through interfaces 10 and 24 to the personal computer 9, together with commands causing the file to be stored in the personal computer's file memory 23. These commands conform to, for example, one of the facsimile-modem standards established by the Electronics Industries Association (EIA), such as the EIA-578 standard (also known as Class 1) or the EIA-592 standard (also known as Class 2). The transfer is carried out at, for example, a rate of 19.2 kilobits per second using a protocol conforming to the T.30 standard established by the International Telecommunication Union (ITU). After being transferred, the file is deleted from the buffer memory 18, thereby freeing additional space in the buffer memory 18, and the above-mentioned memory management information is updated accordingly. Information about the transferred file is not deleted from the facsimile-data directory 20.

In step S4, the directory manager 15 records information in the transferred-data directory 21 indicating which file has been transferred to the personal computer 9. This information is, for example, a pointer to the corresponding entry in the facsimile-data directory 20, or an entry number identifying this entry.

In step S5, the buffer supervisor 13 compares the amount of free space now available in the buffer memory 18 with a second threshold value, which is higher than the first threshold value. If the amount of free space exceeds the second threshold value, the process ends. Otherwise, the process returns to step S2, to select and transfer the next-largest file. The process continues to loop through steps S2, S3, and S4 until an amount of space exceeding the second threshold value is free.

While steps S2, S3, and S4 are being carried out, the facsimile machine 1 sends a signal instructing the distant facsimile machine 2 to stop transmitting data. Step S3 is not carried out until the transmission actually stops. When the second threshold value is exceeded and the process ends, another signal is sent, notifying the distant facsimile machine 2 that it may resume transmission. This procedure reliably avoids buffer overflow, so that no data are lost.

Figure 2:
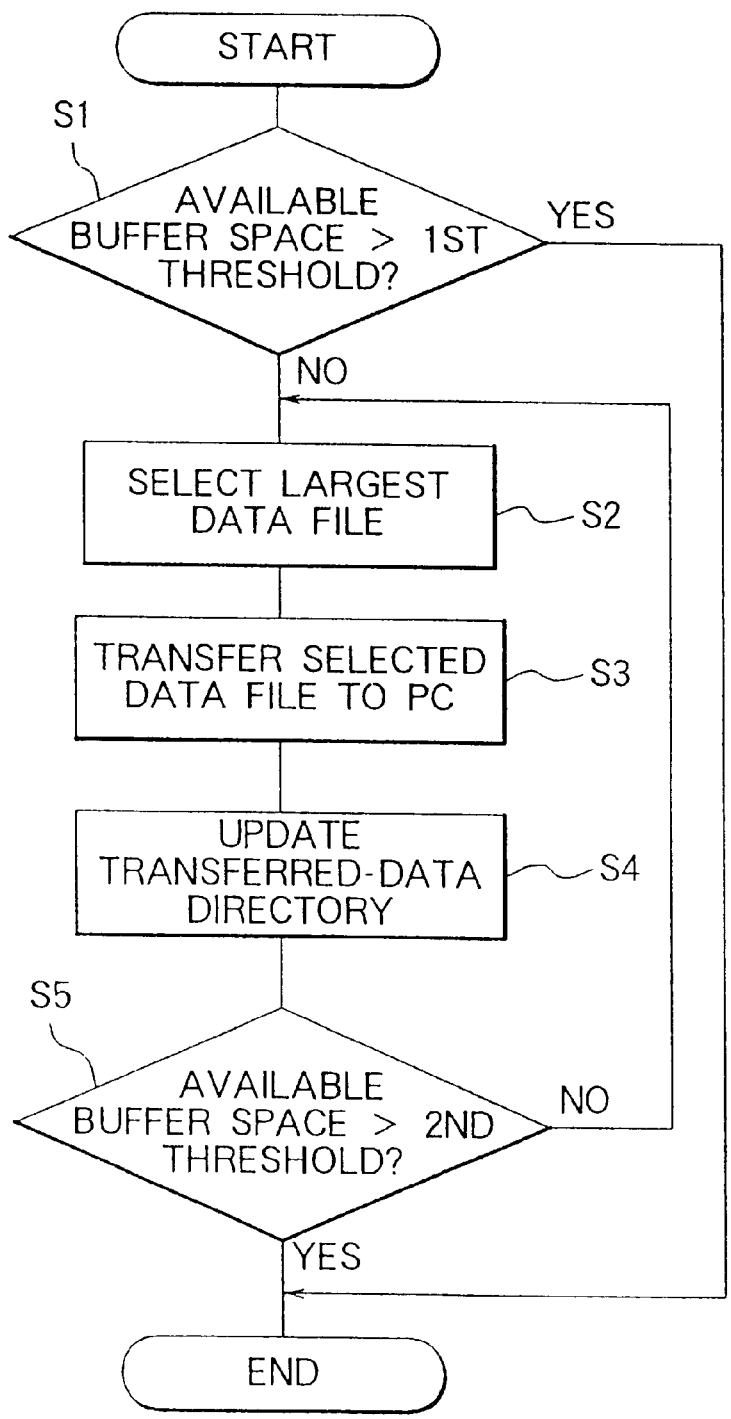
FIG. 2 is a flowchart of operations performed by the first embodiment.

While the facsimile machine 1 is in the print-disabled state, as more facsimile transmissions arrive, the process in FIG. 2 may be carried out any number of times to free up additional space in the buffer memory 18. Thus the facsimile machine 1 is always able to receive facsimile image transmissions, except for the brief intervals in which data are actually being transferred to the personal computer 9. Any amount of facsimile image data can be stored, up to the combined limit of the facsimile machine's buffer memory 18 and the personal computer's file memory 23.

When the print-disabling condition is corrected by supplying additional toner or paper, clearing the paper jam, or taking other action, the CPU 11 detects this and begins sending the data remaining in the buffer memory 18 to the printing unit 8. In addition, the directory manager 15 checks the transferred-data directory 21 to see if any files have been transferred to the personal computer 9. If any files have been transferred, the directory manager 15 fetches the information stored about these files in the facsimile-data directory 20, prepares a transfer report, and sends this transfer report to the printing unit 8 to be printed. The transfer report may be printed either before or after the files remaining in the buffer memory 18.

FIG. 3 shows an example of a transfer report output by the directory manager 15, listing each facsimile transmission that has been transferred to the personal computer 9. In looking through the documents output by the facsimile machine 1, the human user will see this report and learn that additional facsimile transmissions are waiting in the file memory 23 of the personal computer 9. The user can then activate a program running on the personal computer 9 that generates commands, again conforming to the EIA-578 or EIA-592 standard, causing the facsimile files stored in the file memory 23 to be transferred to the facsimile machine 1.

These commands include commands that are transmitted to the facsimile machine 1, notifying the facsimile machine 1 of the impending arrival of data from the personal computer 9. One of these commands activates the facsimile data receiving program 16. The facsimile data receiving program 16 causes the CPU 11 to process facsimile image data received from the PC interface 10, instead of from the telephone line 6. When the CPU 11 is ready, the facsimile data receiving program 16 sends a notification via the PC interface 10, and the actual transfer of data and printing of facsimile documents begins.

Since the transfer report output by the directory manager 15 is printed on paper, the user can see this report even after the personal computer 9 is switched off. There is, accordingly, no danger that the user will remain unaware of facsimile image data stored in the personal computer 9. Moreover, if a large amount of facsimile image data has been stored in the personal computer 9, the user can choose an arbitrary time for transferring the data back to the facsimile machine 1 for printing, which is a more flexible arrangement than having the facsimile machine 1 transfer the data automatically. For example, the user does not have to delay the transmission of an important facsimile document while the facsimile machine 1 works through a large backlog of received data stored in the personal computer 9.

Compared with the prior art, the risk that the facsimile machine 1 will run out of storage space while unable to print is reduced, because the combined capacity of the buffer memory 18 and file memory 23 is used. The risk that a facsimile transmission will end in a partially-received state is also reduced.

The novel transfer report printed by the directory manager 15 eliminates the risk that facsimile image data stored in the computer system 9 will be overlooked by the user, and enables the user to make informed decisions as to when to print the facsimile image data stored in the computer system 9.

Figure 4:
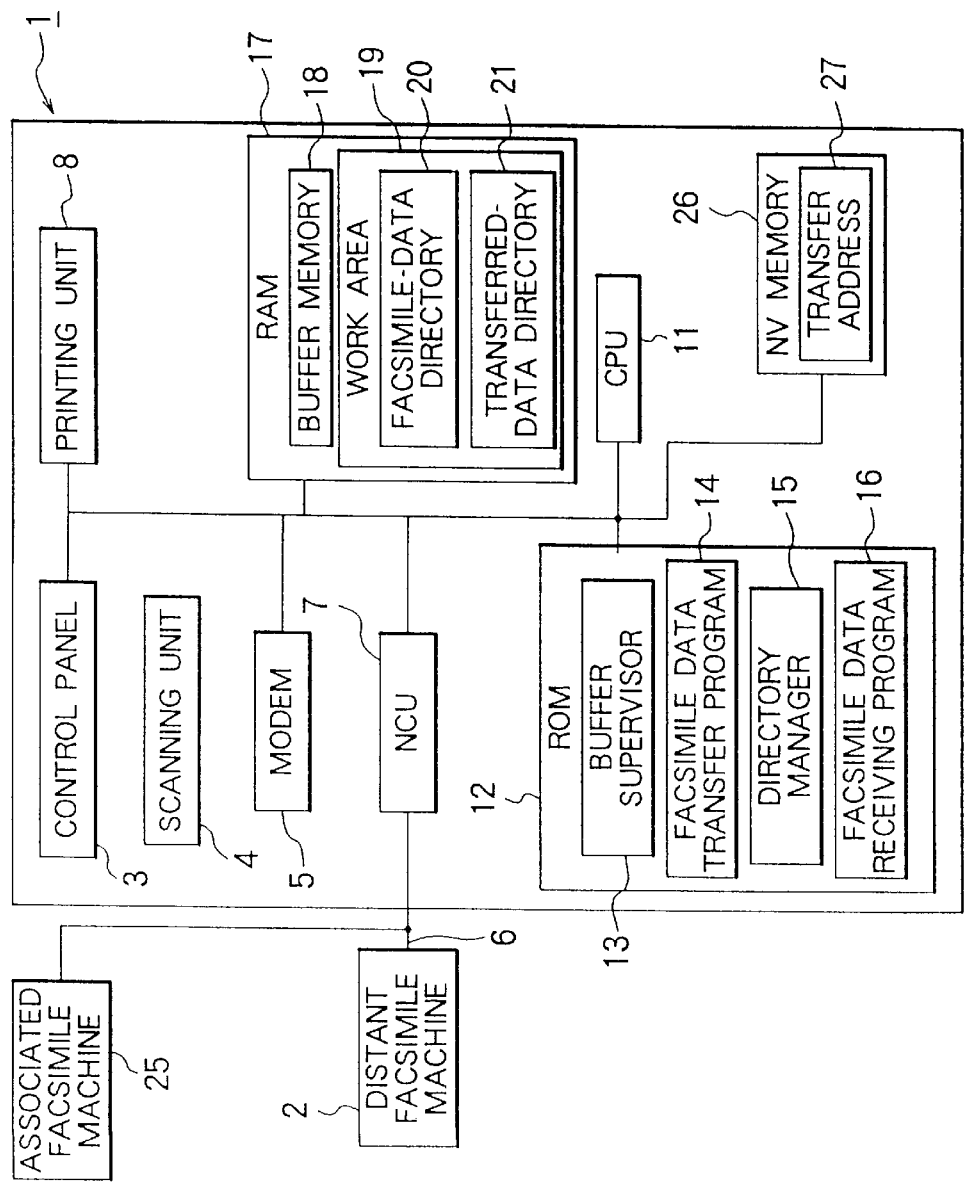
FIG. 4 is a block diagram of the second and third embodiments, illustrating the invented facsimile machine and an associated facsimile machine.

FIG. 4 illustrates the second embodiment of the invention, using the same reference numerals as in FIG. 1 for corresponding parts. The facsimile machine 1 in the second embodiment has no PC interface, but communicates via the NCU 7 with an associated facsimile machine 25, as well as with the distant facsimile machine 2. The associated facsimile machine 25 is, for example, another facsimile machine located in the same building as facsimile machine 1. The associated facsimile machine 25 also has a buffer memory.

The description of the elements in FIG. 4 will be confined to those elements that were not present in the first embodiment, or have functions differing from their functions in the first embodiment. These elements are the facsimile data transfer program 14, facsimile data receiving program 16, and a non-volatile (NV) memory 26 with a transfer address area 27.

The facsimile data transfer program 14 is adapted to transfer facsimile image data through the NCU 7 to the associated facsimile machine 25, instead of to a personal computer. When transferring the data, the associated facsimile machine 25 adds information taken from the facsimile-data directory 20.

The facsimile data receiving program 16 is adapted to receive from the associated facsimile machine 25 facsimile image data that were earlier transferred by the facsimile data transfer program 14. The facsimile data receiving program 16 is not used in the second embodiment, but will be used in a third embodiment, described later.

The non-volatile (NV) memory 26 is, for example, an electrically-erasable programmable read-only memory (EEPROM), a so-called flash memory, or the like. The transfer address area 27 stores the telephone number of the associated facsimile machine 25.

Next, the operation of the second embodiment will be described. The description will focus on the operation when the facsimile machine 1 is disabled.

Figure 5:
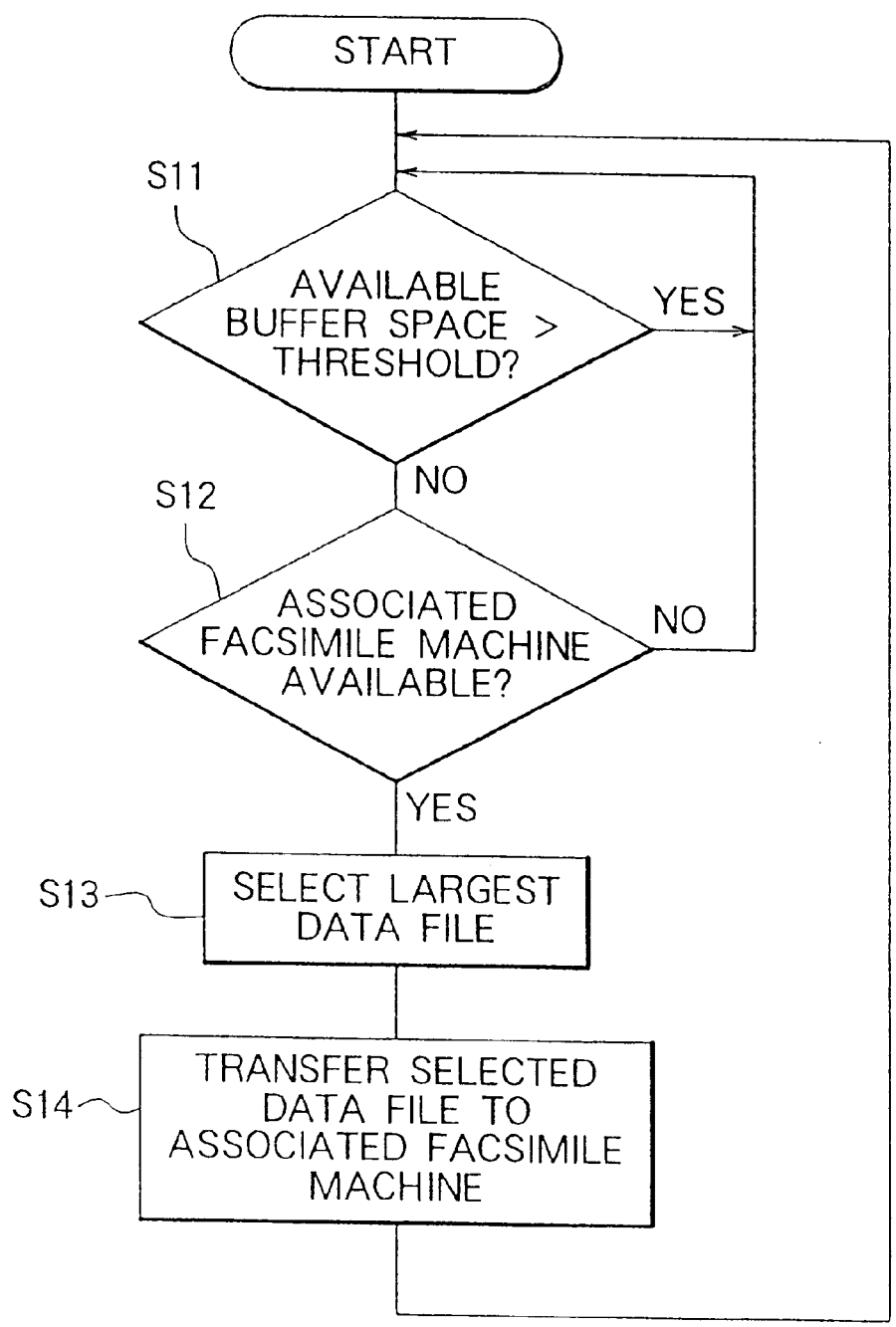
FIG. 5 is a flowchart of operations performed by the second embodiment.

Referring to FIG. 5, as in the first embodiment, the buffer supervisor 13 monitors the amount of free space available in the buffer memory 18 and compares this amount with a threshold value (step S11). When the amount of available space falls below the threshold value, the non-volatile memory 26 is checked to see if the telephone number of another facsimile machine is recorded in the transfer address area 27 (step S12). If no such telephone number has been recorded, then no associated facsimile machine is available, so the process returns to step S11 and continues to loop between steps S11 and S12 until the disabling condition is corrected.

In the present case an associated facsimile machine 25 is available and its telephone number is stored in the transfer address area 27, so the processing proceeds to steps S13 and S14. Instep S13, the facsimile data transfer program 14 selects the largest facsimile image data file stored in the buffer memory 18, as in the first embodiment. In step S14, the facsimile data transfer program 14 transfers this file through the NCU 7 to the associated facsimile machine 25, together with information taken from the facsimile-data directory 20 describing the file, and information indicating that the file is being transferred from facsimile machine 1 because facsimile machine 1 is temporarily disabled. This information is transferred in a high-level data link control frame (HDLC frame), which will be described later.

The transferred file is then deleted from the buffer memory 18 of facsimile machine 1, and the process returns to step S11, in which the buffer supervisor 13 again compares the available buffer space with the threshold value. Steps S11 to S14 are repeated until an amount of buffer space exceeding the threshold value has been freed.

Upon receiving the facsimile image data and other information transferred from facsimile machine 1, the associated facsimile machine 25 prints the facsimile image data, and prints a facsimile transfer notice summarizing the other information. FIG. 6 shows an example of this facsimile transfer notice, which lists the serial number, sender, date and time, and number of pages of each transferred facsimile transmission. The serial numbers listed in this notice are serial numbers applied at facsimile machine 1. The facsimile transfer notice also gives the telephone number of facsimile machine 1. On the basis of this information, the transferred facsimile documents can be delivered by hand to the user of the disabled facsimile machine 1.

The second embodiment enables facsimile machine 1 to receive an unlimited amount of facsimile image data while in a disabled condition. The user can moreover obtain the printed output without having to wait for the disabling condition to be corrected, by fetching the printed documents from the associated facsimile machine 25.

The operations described above make no use of the transferred-data directory 21, but the information in this directory can be employed when facsimile machine 1 prints a report listing received facsimile transmissions, to indicate which transmissions were printed at the associated facsimile machine 25.

Next the third embodiment will be described. The third embodiment combines features of the first and second embodiments, using the buffer memory in the associated facsimile machine 25 in the same general way that the file memory of the personal computer system was used in the first embodiment. This arrangement is particularly convenient when facsimile machine 1 and the associated facsimile machine 25 are widely separated, making hand delivery inconvenient, and is also desirable when facsimile machine 1 receives confidential facsimile transmissions intended only for the eyes of the user of facsimile machine 1.

The third embodiment has the same hardware configuration as the second embodiment, illustrated in FIG. 4.

Figure 7:
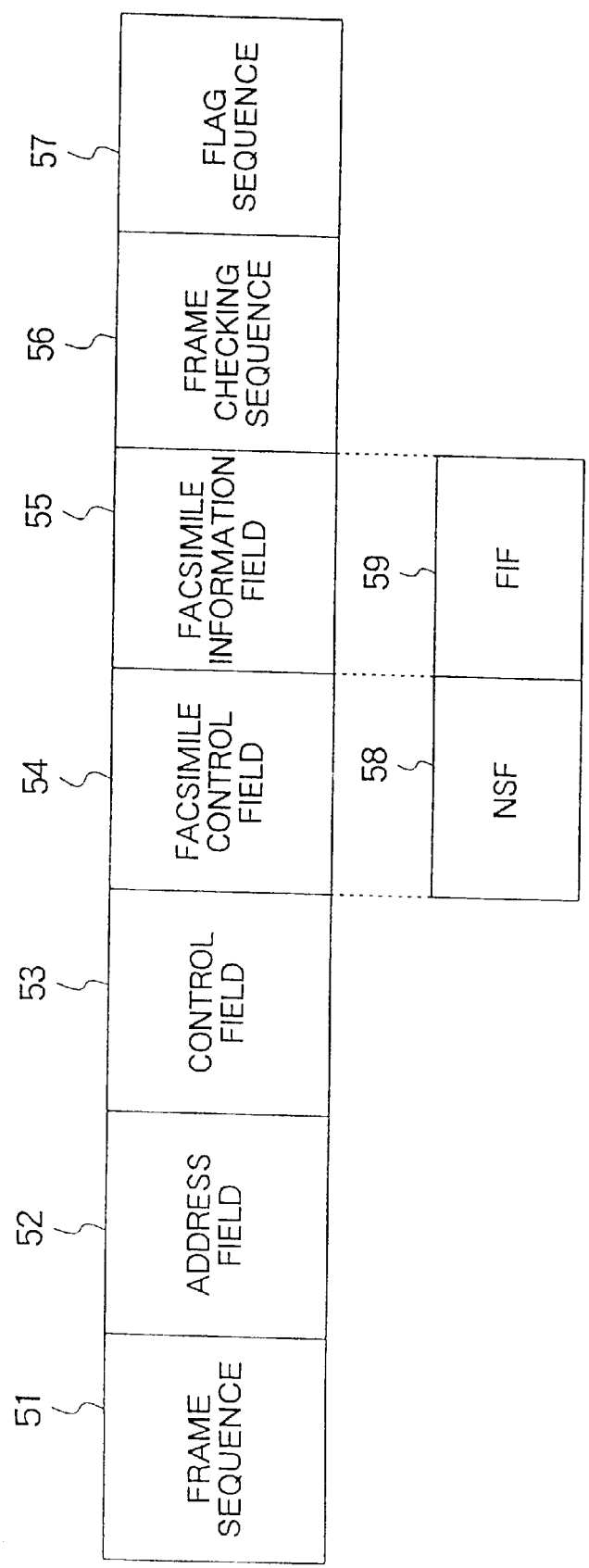
FIG. 7 illustrates the format of a high-level data link control frame.

FIG. 7 shows the format of the above-mentioned HDLC frame, which comprises a flag sequence 51 indicating the beginning of the frame, an address field 52 containing telephone number information, a control field 53 used for transferring commands and responses related to data link control, a facsimile control field 54 containing eight bits of facsimile-related information, a facsimile information field 55 containing further facsimile-related information, a frame checking sequence 56 used for error checking, and another flag sequence 57 indicating the end of the frame.

Figure 9:
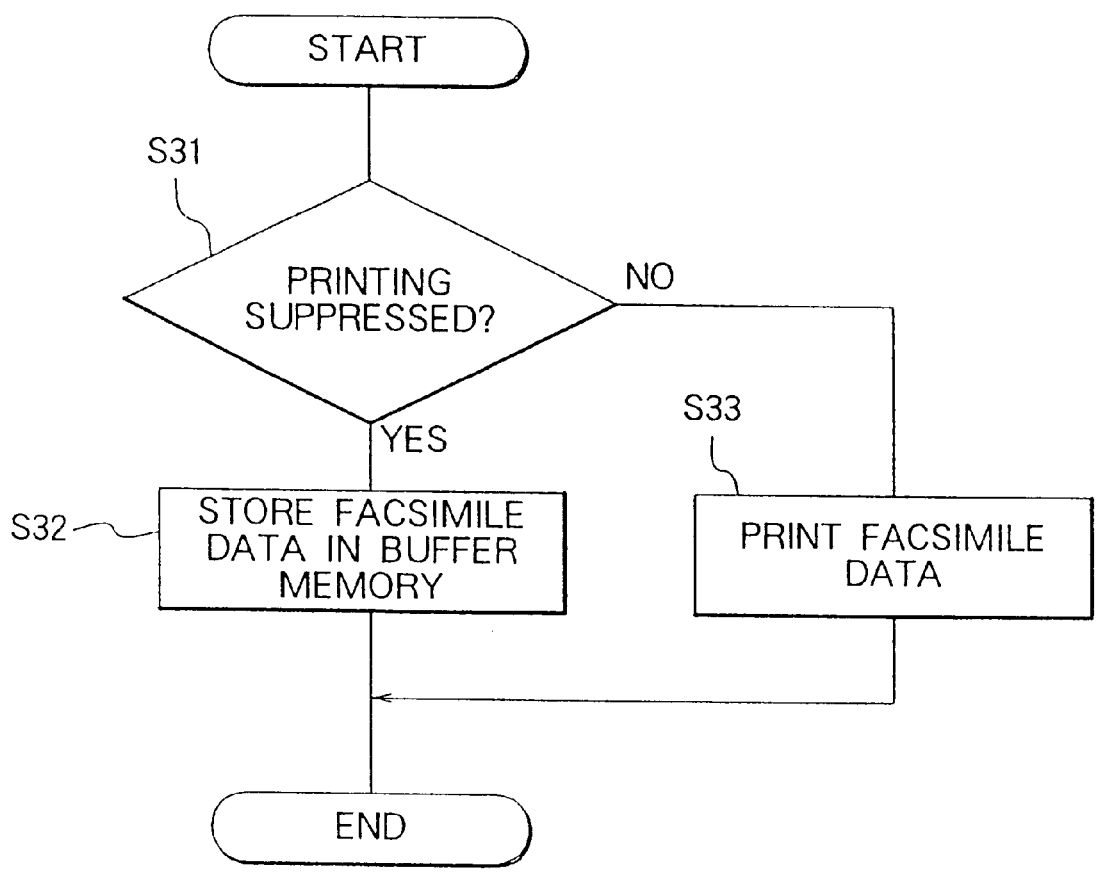
FIG. 9 is a flowchart of operations performed by the associated facsimile machine in the third embodiment.

The facsimile control field 54 may contain a non-standard facilities (NSF) designation 58, in which case the facsimile information field 55 contains user-defined information 59, indicated in FIG. 7 by the letters FIF. (FIF is an abbreviation of facsimile information field.) In the third embodiment, one of the items in this user-defined information is an item of print-suppression information, comprising at least one bit which can be set to inhibit the printing of the accompanying facsimile image data. The associated facsimile machine 25 is adapted to interpret this information and take appropriate action, as explained later (FIG. 9).

Next, the operation of the third embodiment will be described. The description will be confined to the operations related to the transfer of facsimile image data between facsimile machine 1 and associated facsimile machine 25. Like the first embodiment, the third embodiment employs two threshold values, the second threshold value being higher than the first.

Figure 8:
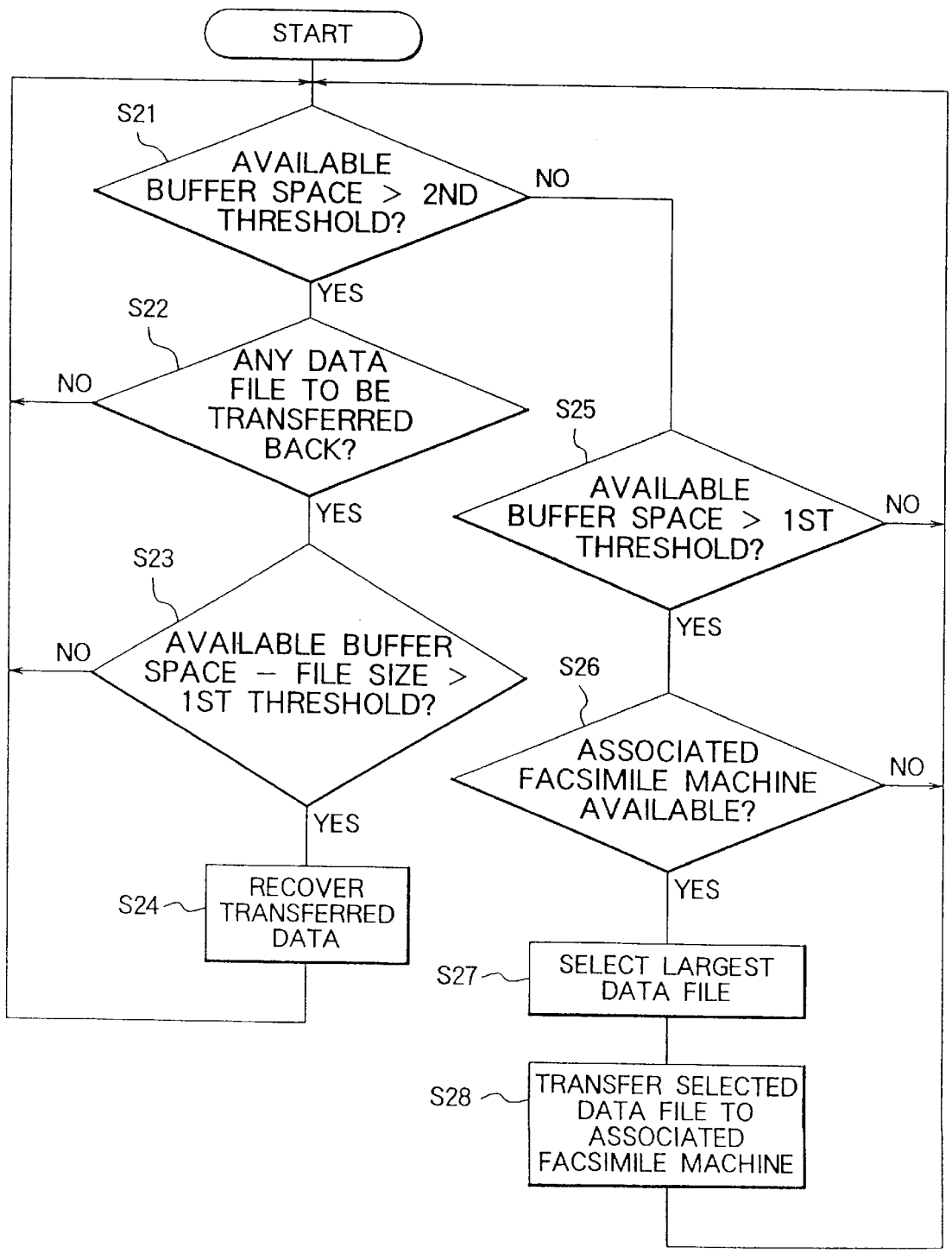
FIG. 8 is a flowchart of operations performed by the invented facsimile machine in the third embodiment.

Referring to FIG. 8, the buffer supervisor 13 starts by comparing the available buffer space with the second threshold value (step S21). If space is available in excess of the second threshold value, the transferred-data directory 21 is checked to see if any facsimile image data files have been transferred to the associated facsimile machine 25 with a print-suppression designation in the accompanying IDLC frame (step S22). If no such data files have been transferred, the process returns to step S21.

If at least one such facsimile image data file has been transferred to the associated facsimile machine 25, the buffer supervisor 13 next decides whether that file can be transferred back without causing the amount of free space in the buffer memory 18 to drop to or below the first threshold value. Specifically, the buffer supervisor 13 subtracts the size of the file, which is obtained from information in the facsimile-data directory 20, from the available buffer space, and compares the result with the first threshold value (step S23). If the result is equal to or less than the first threshold value, the process returns to step S21.

If the result in step S23 is greater than the first threshold value, the facsimile data receiving program 16 calls the associated facsimile machine 25 through the NCU 7, and commands the associated facsimile machine 25 to transfer the relevant facsimile image data file. Since this file was transferred to the associated facsimile machine 25 with a print-suppression designation, the file is still stored in the buffer memory of the associated facsimile machine 25. The associated facsimile machine 25 transmits the file from its buffer memory to facsimile machine 1, which receives and prints the facsimile image data (step S24). After the facsimile image data have been received from the associated facsimile machine 25 and printed, the directory manager 15 deletes the corresponding entry from the transferred-data directory 21. The process then returns to step S21, enabling a different facsimile image data file to be recovered from the associated facsimile machine 25.

If in step S21 the available buffer space does not exceed the second S threshold, the buffer supervisor 13 next compares the available space with the first threshold value (step S25). If the available buffer space exceeds the first threshold value, the process returns to step S21. Otherwise, processing proceeds as in the second embodiment: availability of the associated facsimile machine 25 is checked (step S26); the largest facsimile image data file is selected (step (S27); and this file is transferred to the associated facsimile machine 25 (step S28).

When transmitting facsimile image data to the associated facsimile machine 25 in step S28, the facsimile data transfer program 14 always places print-suppression information in the accompanying HDLC frame, thus instructing the associated facsimile machine 25 not to print the data. When facsimile machine 1 transmits facsimile image data that originated at facsimile machine 1, and were not received from a distant facsimile machine 2, to the associated facsimile machine 25, however, such print-suppression information is not included in the HIDLC frame.

FIG. 9 illustrates the operations performed by the associated facsimile machine 25 in receiving a facsimile transmission. In step S31, the associated facsimile machine 25 checks the facsimile control field 54 in the HDLC frame in FIG. 7. If the facsimile control field 54 is found to contain an NSF designation 58, the associated facsimile machine 25 checks the print suppression information in the FIF 59. If printing is suppressed, the associated facsimile machine 25 proceeds to step S32 in FIG. 9 and stores the facsimile image data in its buffer memory, but does not print the data. If printing is not suppressed, the associated facsimile machine 25 proceeds to step S33 and prints the facsimile image data.

The third embodiment permits facsimile machine 1, while disabled from printing, to receive facsimile transmissions up to the combined capacity of the buffer memories in both facsimile machines 1 and 25. Moreover, facsimile image data that were transferred to the associated facsimile machine 25 can be recovered automatically, without the need for hand delivery, and without the risk of confidential documents being seen by unintended eyes.

The second and third embodiments can be combined in the following manner. Facsimile transmissions received in a normal mode while facsimile machine 1 is disabled can be transferred to the associated facsimile machine 25 and printed as in the second embodiment. Facsimile transmissions received in a confidential mode while facsimile machine 1 is disabled can be transferred to the associated facsimile machine 25 with printing suppressed as in the third embodiment, then transferred back to facsimile machine 1 and printed later, after the disabling condition at facsimile machine 1 has been corrected. In this case, the transferred-data directory 21 also stores information indicating whether printing was or was not suppressed.

This combination of the second and third embodiments enables an unlimited amount of facsimile transmissions to be received in the normal mode while facsimile machine 1 is disabled. The buffer memories of facsimile machines 1 and 25 can be used principally to store facsimile transmissions received in the confidential mode. The advantages of both the second and third embodiments are therefore obtained.

This combination of the second and third embodiments can be extended to operations performed when facsimile machine is not disabled, but the user of facsimile machine 1 wishes to store received facsimile transmissions in the buffer memory of facsimile machine 1 without printing them immediately, to avoid having the facsimile transmission seen by another party, for example. In this case, the combined use of the second and third embodiments enables such facsimile transmissions to be stored up to the combined capacities of the buffer memories in both facsimile machines 1 and 25, instead of just the capacity of facsimile machine 1.

The third embodiment, or the combination of the second and third embodiments, also enables the buffer memory space of a facsimile machine to be expanded for the purpose of storing facsimile image data for delayed transmission at a designated later time. The user can have facsimile machine 1 scan documents for later transmission up to the combined buffer memory capacities of both facsimile machines 1 and 25. When the remaining space in the buffer memory 18 of facsimile machine 1 falls below the first threshold value, facsimile image data are transferred to the associated facsimile machine 25 with printing suppressed.

Although the buffer supervisor 13, facsimile data transfer program 14, directory manager 15, and facsimile data receiving program 16 have been described as being stored in the ROM 12 and executed by the CPU 11, this is not a restriction. These programs can be stored in another type of memory, or executed by another processor. Alternatively, equivalent buffer supervisory means, facsimile data transfer means, directory managing means, and facsimile data receiving means can be provided in an application-specific integrated circuit.

The above embodiments have been described as transferring facsimile image data files in descending order of size, but the invention is not restricted to this order. Facsimile image data files can be transmitted according to a priority order, or to various other criteria. Also, in the third embodiment, no restriction is placed on the order in which the facsimile image data are transferred back from the associated facsimile machine 25 to facsimile machine 1.

Those skilled in the art will recognize that further variations are possible within the scope of the invention as claimed below.

What is claimed is:

1. A facsimile machine with a buffer memory for storing image data received when said facsimile machine is unable to print and an interface to a computer system, comprising:

a buffer supervisory means coupled to said buffer memory, for determining how much available space is present in said buffer memory and comparing said available space with at least one threshold value; and a data transfer means coupled to said buffer memory, for automatically transferring received image data from said buffer memory through said interface to said computer system with commands causing said received image data to be stored in said computer system, responsive to the determining and comparing performed by said buffer supervisory means, when said buffer supervisory means determines that said buffer memory does not have more available space than said threshold value.

2. The facsimile machine of claim 1, wherein said data transfer means selects received image data of greatest size in said buffer memory for transfer to said computer system.

* * * * *